United States Patent [19]  
Cohen, deceased et al.

[11] 3,939,947  
[45] Feb. 24, 1976

[54] DASHPOT FOR EITHER PUSH OR PULL DAMPING

[75] Inventors: Arthur M. Cohen, deceased, late of Westport, Conn., by Ruth S. Cohen; Irving Evall, Freeport; Leonard Zalkin, executors, Woodmere, both of Conn.

[73] Assignee: Airpot Corporation, Norwalk, Conn.

[22] Filed: Aug. 19, 1974

[21] Appl. No.: 498,585

[52] U.S. Cl. .............. 188/282; 137/270; 188/317; 188/322; 251/319
[51] Int. Cl.² ..................................... F16F 9/34
[58] Field of Search ........... 188/281, 282, 313, 316, 188/317, 322, 276; 137/270; 251/319; 403/132, 133, 138

[56] References Cited
UNITED STATES PATENTS

| 491,794 | 2/1893 | Barker | 188/317 |
| 661,839 | 11/1900 | Adams | 188/276 |
| 1,312,599 | 8/1919 | Webb | 188/313 |
| 1,556,599 | 10/1925 | Harbecke | 188/282 |
| 2,429,914 | 10/1947 | Beede | 188/317 |
| 2,881,870 | 4/1959 | Thumim | 188/281 |
| 3,020,981 | 2/1962 | Day | 188/313 |
| 3,411,815 | 11/1968 | Sullivan, Jr. | 403/138 |
| 3,854,557 | 12/1974 | Wilcox | 188/282 |

FOREIGN PATENTS OR APPLICATIONS

| 141,788 | 11/1949 | Australia | 188/316 |

Primary Examiner—Trygve M. Blix  
Assistant Examiner—Edward R. Kazenske

[57] ABSTRACT

A dashpot is disclosed which can exhibit either push or pull damping depending upon the orientation of the valve members thereof. The dashpot includes a cylinder, a piston sealingly slidable within the cylinder and a piston rod operatively connected to the piston to move same. The piston is provided with a fluid flow channel which extends therethrough. A first valve member is operatively connected to the piston rod for movement therewith. A second valve member is mounted on said piston and has a fluid passage which communicates with the fluid flow channel of the piston. The first valve member is received within the second valve member in either a first or a second orientation relative thereto, thereby defining the direction of the damping force. The first and second valve members have parts which are operative, when force is applied to the piston rod in one axial direction or the other, to close or open the fluid passage respectively. One relative orientation of the valve members closes the fluid passage when the piston rod is urged in one axial direction and the other relative orientation of the valve members closes the fluid passage when the piston rod is urged in the other direction.

23 Claims, 4 Drawing Figures

DASHPOT FOR EITHER PUSH OR PULL DAMPING

The present invention relates to dashpot assemblies and more particularly to a dashpot assembly which can be used to produce push damping or pull damping depending upon the orientation of certain portions thereof.

The basic purpose of a dashpot assembly is to create a resistive or damping force to movement in a given direction. In general, the assembly consists of a piston which is slidable within a cylinder. The piston sealingly engages the walls of the cylinder such that if the piston is pulled from the cylinder a vacuum is created producing a highly resistive force to the movement of the piston. On the other hand, if the piston is pushed toward the cylinder the fluid (usually air) trapped between the piston and the cylinder creates a resistive force to the movement of the piston.

If a channel permitting free fluid flow is provided through the piston, the resistive forces are eliminated because fluid can enter and leave the cavity between the piston and the cylinder as necessary. If a valve means is provided to regulate the flow of fluid through the fluid flow channel, the fluid flow through the channel can be impeded in one direction such that a substantial resistive force is developed when the piston is moved relative to the cylinder in that direction but when the piston is moved relative to the cylinder in the other direction, no appreciable resistive force is developed. The rod which moves the piston within the cylinder can be operatively connected to the valve means such that it serves to open and close the valve as well as to move the piston. There are two types of such unidirectionally acting dashpots, to wit, a push damping dashpot, which creates a substantial resistive force only as the piston is pushed deeper into the cylinder, and a pull damping dashpot, which creates a substantial resistive force only when the piston is pulled from the rear wall of the cylinder. In a push damping dashpot the valve means must close the fluid flow channel only when the piston is pushed relative to the cylinder and in a pull damping dashpot the valve means must close only when the piston is pulled relative to the cylinder. As a result, in prior art dashpots the construction of a push damping dashpot is different from the construction of a pull damping dashpot. Thus, dashpots are built as either of the push damping or pull damping types, and the artisan chooses between the two depending upon the particular application for which the dashpot is to be used. Therefore, dashpot manufacturers had to produce and inventory two separate types of dashpots in each size. This duplication added to the cost of the dashpot because of the extra tooling and inventory control which was necessary.

It is, therefore, a prime, object of the present invention to provide a dashpot which can be utilized to produce either push damping or pull damping with the same parts, and by simply changing the orientation of certain of the parts thereof.

It is another object of the present invention to provide a dashpot having a valve means with members having a ball and socket interengagement, the socket portion being made of resilient material such that the ball portion can be inserted into either end of the socket portion.

It is a further object of the present invention to provide a dashpot wherein the relative orientation of the ball and socket portions of the valve means determines the direction of the damping force applied by the dashpot.

In accordance with the present invention a dashpot is provided comprising a cylinder with a piston sealingly mounted therein for slidable movement relative thereto. A piston rod is operably connected to the piston for moving the piston within the cylinder. Fluid flow means extend through the piston and comprise a fluid flow channel and valve means.

The valve means comprises a first valve member, preferably in the form of a ball, operably connected to the piston rod for movement therewith and a second valve member, preferably in the form of a resilient socket, within which the first valve member is received. The second valve member is preferably in the form of hollow cylinder having a valve seat on one end thereof and an aperture on the other. The second valve member is mounted on the piston, as by being received in rigid piston-carried casing. The second valve member has a fluid passage therethrough which is in fluid communication with the fluid flow channel through the piston. The first valve member is movable to a limited degree within the second valve member such that when the first valve member is adjacent the valve seat, fluid flow is prevented through the valve means. However, when the first valve member is adjacent the aperture, the shape of the aperture prevents sealing engagement therebetween, thus permitting fluid flow through the valve means. The second valve member can be associated with the first valve member in either a first or a second orientation relative thereto. The relative orientation of the first valve member and the second valve member determines whether the valve will seal, and hence whether the dashpot will damp, in the push or the pull direction.

If the valve seat is situated on the piston side of the second valve member, then when the rod is moved axially to push the piston the first valve member will sealingly engage the valve seat at the end of the second valve member thereby producing a push damping effect. On the other hand, if the second valve member is reversed in orientation, when the piston rod pulls the piston the first valve member will make sealing engagement with the valve seat thereby producing a pull damping effect. Because the aperture at the opposite end of the second valve member is shaped to prevent sealing engagement with the first valve member, when the first valve member is adjacent thereto fluid flow through the valve means is not inhibited and the piston can move freely. This occurs when the piston is pulled in a push damping dashpot and when the piston is pushed in a pull damping dashpot.

Thus, the first and second valve members have parts which are operative when force is applied to the piston rod in one axial direction or the other to close or open the fluid passage, respectively. One relative orientation of the valve members closes the fluid passage when the piston rod is urged in one axial direction, and the other relative orientation of the valve members closes the fluid passage when the piston rod is urged in the other axial direction.

Since the second valve member is made of resilient material the first valve member may be inserted therein after the manufacture thereof. It is the orientation of the second valve member relative to the first valve member which determines whether the dashpot produces push damping or pull damping. Depending upon which direction of damping is required for a particular application, the second valve means is oriented with respect to the first valve means and the first means is inserted therein. Specifically, if push damping is required, the first valve means is inserted through the aperture side of the second valve means and the first and second valve means combination inserted into the casing with the piston rod extending therefrom. If pull damping is required, the first valve means is inserted through the valve seat end of the second valve member, and the first and second valve member combination is inserted into the casing with the aperture adjacent the fluid flow channel in the piston. Again, the piston rod extends from the casing but in this instance through the valve seat end of the second valve member.

To the accomplishment of the above and to such other aspects as may hereinafter appear, the present invention relates to a dashpot assembly which can be used for either push or pull damping depending upon the orientation of certain portions thereof as defined in the appended claims and as described in the specification, taken together with the accompanying drawings in which:

Figure 1:
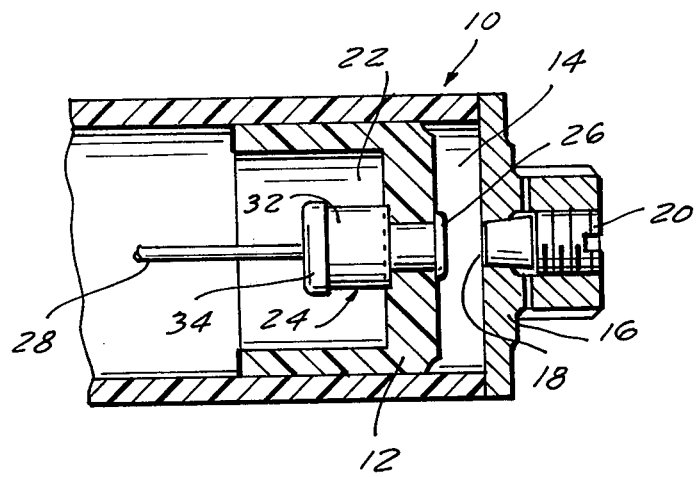
FIG. 1 is a side cutaway view of the dashpot of the present invention.

As seen in FIG. 1 the dashpot of the present invention comprises a cylinder 10 in which a piston 12 is slidable. Piston 12 sealingly engages the inner walls of cylinder 10 such that a substantially fluid tight seal is produced. A fluid cavity 14 is present between piston 12 and the back wall of cylinder 10 whenever piston 12 is spaced from back wall 16. Back wall 16 is provided with an aperture 18 which is engaged by a plug 20 mounted within rear wall 16. Plug 20 is preferably adjustably received within wall 16 such that it may seal aperture 18 completely or permit a certain amount of fluid flow therethrough. The adjustable mounting of plug 20 may be of any conventional nature such as interlocking screw threads. The rotation of plug 20 varies the insertion thereof into aperture 18 and thus the sealing engagement therebetween. Preferably, the walls of aperture 18 and the tip of plug 20 are reciprocally tapered such that by rotating plug 20 the desired amount of fluid flow can be achieved. The amount of fluid flow through aperture 18 controls the amount of fluid which may flow to or from cavity 14 when the piston is moved in the damped direction thereby regulating the amount (but not the direction) of damping force exerted by the dashpot.

Piston 12 is preferably provided with a recess 22 in the interior thereof. It is within recess 22 that the fluid flow means 24 is mounted. A portion of fluid flow means 24 is a fluid flow channel defined by a hollow tubular member 26 which extends through piston 12. The channel provides fluid communication between cavity 14 and the remainder of fluid flow means 24. A piston rod 28 extends from fluid flow means 24 and is utilized both to move piston 12 within cylinder 10 and to control the valve action of fluid flow means 24.

In a push damping dashpot, when piston rod 28 is urged towards rear wall 16 of cylinder 10 (towards the right as seen in FIG. 1), piston 12 will move towards rear wall 16 and fluid flow means 24 will close the passage through member 26 thereby compressing the fluid in cavity 14 and causing a resistive force to the movement of the piston. The placement of plug 20 within aperture 18 will determine how quickly the fluid can escape from cavity 14 and thus the amount of resistive force exerted against the movement of piston 12. In a pull damping dashpot. the movement of rod 28 would not close the channel defined by tubular member 26 and the fluid in cavity 14 could easily escape causing no resistance to the movement of the piston. The placement of plug 20 within aperture 18 will determine how quickly the fluid can escape from cavity 14 and thus the amount of resistive force exerted against the movement of piston 12.

In a pull damping dashpot, the movement of rod 28 would not close the channel defined by tubular member 26 and the fluid in cavity 14 could easily escape causing no resistance to the movement of the piston. However, in a pull damping dashpot the movement of piston rod 28 away from the back wall 16 of cylinder 10 (towards the left in the drawings) would seal the channel defined by tubular member 26 thus preventing fluid from entering cavity 14 through the channel. This creates a resistive force to the movement of the piston. Again, plug 20 regulates the in-flow of fluid into cavity 14 and thus determines the amount of resistive force. In a push damping dashpot where the rod was pulled, the channel defined by tubular member 26 would not be sealed and fluid would be free to flow into cavity 14. In this mode, no resistance would be exerted on the movement of the piston.

Figure 2:
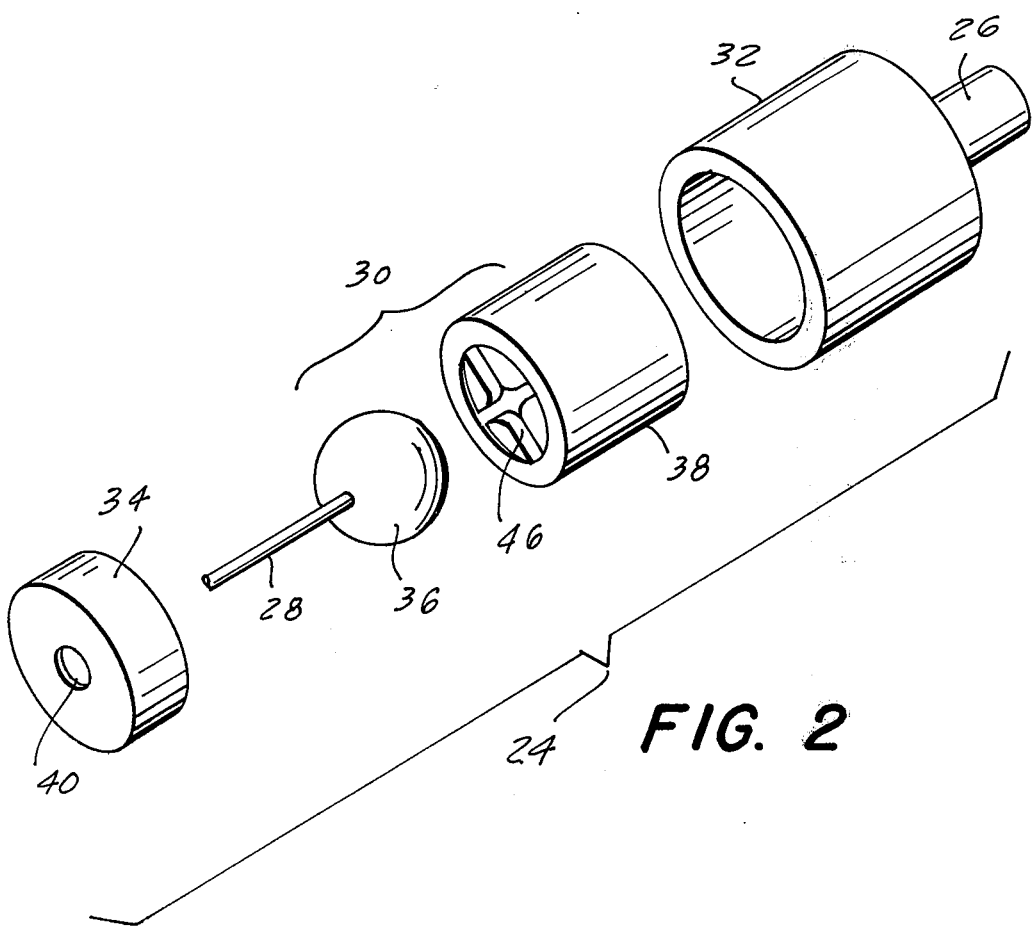
FIG. 2 is an exploded view of the fluid flow means of the dashpot of the present invention.

FIG. 2 shows an exploded view of the fluid flow means 24 of the present invention. Fluid flow means 24 comprises valve means 30, a casing 32 which is connected to tubular member 26 and a casing cover 34. Valve means 30 comprises a first valve member 36, preferably spherically shaped and a second valve member 38, preferably shaped in the form of a socket. First valve member 36 is received within second valve member 38 and the first and second valve member assembly are then placed within casing 32. Casing 32 is made of a rigid material to provide the necessary structural support for the valve members and is essentially a hollow cylinder with an inner diameter slightly larger than the outer diameter of second valve member 38. Closure member 34 is provided to completely enclose the valve members by mounting on casing 32 thus completing the enclosure. Closure member 34 is provided with an aperture 40 through which piston rod 28 extends. Thus, when closure member 34 is mounted on casing 32 a hollow cylinder with a port at each end is formed. One of the ports is in fluid communication with the channel defined by tubular member 26. The other port, aperture 40, is in fluid communication with recess 22. Thus, if not prevented by valve means 30, fluid flow may take place through aperture 40 within casing 32 and through the channel defined by tubular member 26 into cavity 14. As long as valve means 30 does not prevent fluid flow through casing 32, there will be substantially no resistance to the movement of piston 12 within cylinder 10 in either direction.

Figure 3:
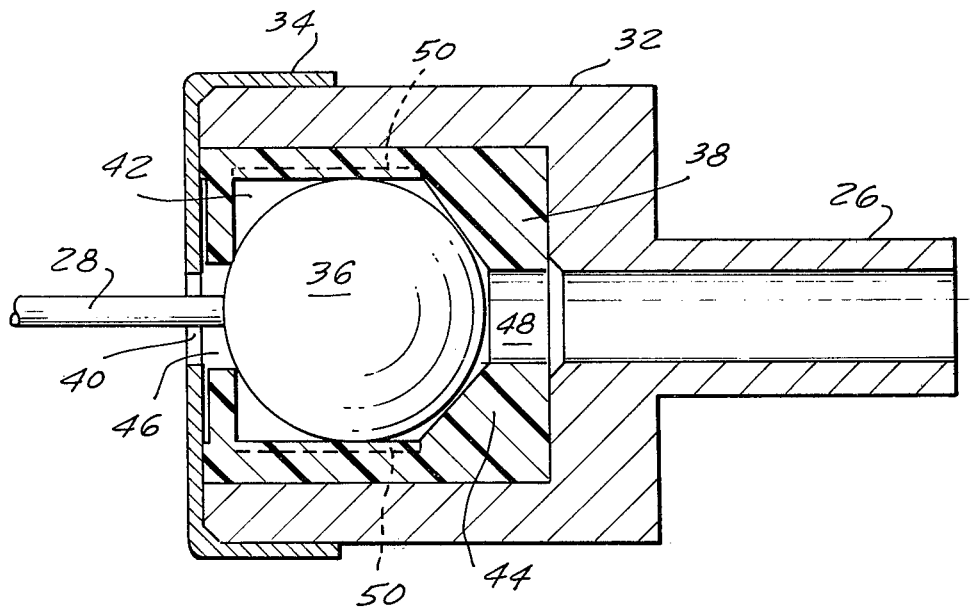
FIG. 3 is a side cutaway view of the fluid flow means of the present invention showing the dashpot oriented for push damping.
Figure 4:
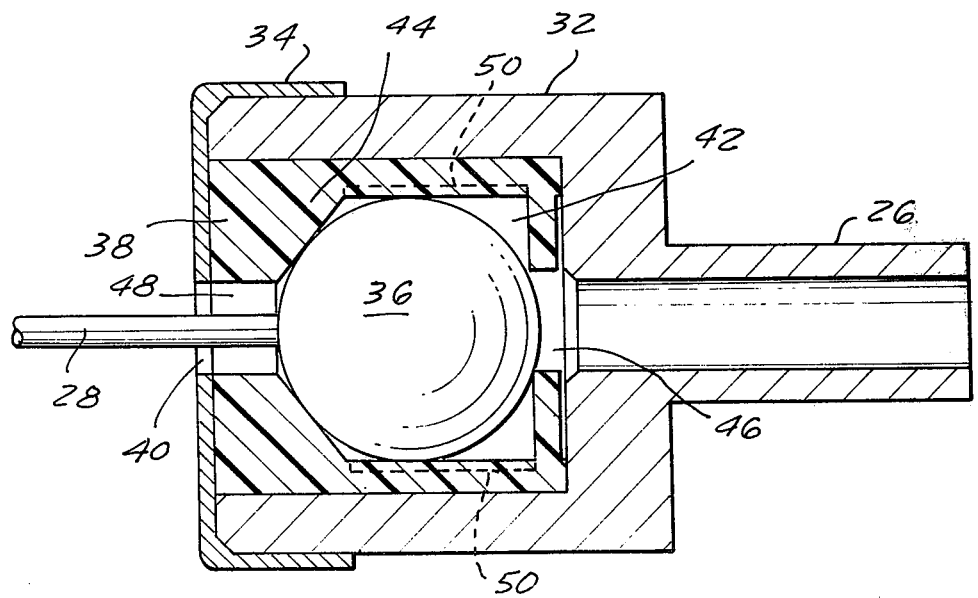
FIG. 4 is a view similar to FIG. 3 but showing the dashpot of the present invention oriented for pull damping.

As can best be seen from FIGS. 3 and 4, second valve member 38 is essentially cylindrical in form and is provided with a fluid chamber 42 therein large enough to receive first valve member 36. Chamber 42 has a valve seat 44 at one end thereof and an aperture 46 at the other. Valve seat 44 consists of a flanged opening 48 having tapered sides such that when first valve member 36 is adjacent thereto, sealing engagement between valve seat 44 and first valve member 36 is achieved. The sealing engagement between valve seat 44 and first valve member 36 prevents fluid flow through fluid passage 42. Aperture 46, on the other hand, is formed with an irregularly shaped flange in order to prevent sealing engagement between it and first valve member 36 regardless of the position of first valve member 36. Thus, when first valve member 36 is placed adjacent aperture 46, fluid flow through passage 42 is not prevented. In order to assure this result, aperture 46 is normally irregularly shaped and may be in the form of a cross with an enlarged center portion, as shown in FIG. 2. The inner surface of second valve member 36 is provided with a plurality of grooves 50 which extend axially along the side walls of passage 42 such that fluid flow is permitted around first valve member 36 at all times except when first valve member 36 sealingly engages valve seat 44.

Second valve member 38 is made of resilient material such that first valve member 36 may be inserted therein either through aperture 46 or valve seat 44. Second valve means 38 is formed to have an outer configuration which is bilaterally symmetrical about a line perpendicular to the axis thereof. Thus, second valve means 38 may be oriented with respect to first valve means 36 in one of two ways and then the first and second valve member combination inserted into casing 32 in either orientation. FIGS. 3 and 4 respectively show the two orientations. FIG. 3 shows the orientation which will cause the dashpot to create a push damping action. FIG. 4 shows an orientation which will cause the dashpot to create a pull damping action.

In FIG. 3 aperture 48 is in fluid communication with the channel defined by tubular member 26, and aperture 46 is in fluid communication with aperture 40. When piston rod 28 is moved towards the right in the drawings, first valve member 36 moves a limited amount to the right (as seen in the drawings) thus sealingly engaging valve seat 44 and preventing the flow of air through passage 42. Thus, a great deal of resistive force is developed as the piston is pushed deeper into the cylinder. On the other hand, if piston rod 28 is moved towards the left (as seen in the drawings), first valve member 36 will be adjacent aperture 46. However, due to the irregularity of aperture 46 no sealing engagement is possible. Thus, fluid is free to flow through aperture 40, through aperture 46 around first valve member 36 by means of grooves 50 and through aperture 48 into the channel defined by tubular member 26. In this way, no resistive force is developed as the piston is pulled from the cylinder.

FIG. 4 shows the pull damping orientation in which second valve member 38 is inserted within casing 32 in the reverse direction. In this case, it is aperature 46 which is in fluid communication with the channel defined by tubular member 26 and aperture 48 which is in fluid communication with aperture 40. The piston rod 28 extends through aperture 48. When piston rod 28 is moved to the right (as seen in the drawings) to push piston 12 deeper into cylinder 10, first valve member 36 is urged against aperture 46. However, due to the irregularities in the shape of aperture 46, no sealing engagement is created and fluid is free to flow through the channel defined by tubular member 26 through aperture 46 around first valve member 36 by means of grooves 50 and through apertures 48 and 40 without substantial resistance. Thus, there is no damping in the push direction. On the other hand, when rod 28 is moved towards the left (as seen in the drawing) first valve member 36 sealingly engages valve seat 44 thus preventing the flow of fluid through passage 42. As a result, the pull damping action is achieved.

It should be noted that passage 42 permits only a limited degree of movement of first valve member 36 relative to second valve member 38. Preferably, the second valve member 38 is shaped so that first valve member 36 is normally in contact with valve seat 44 and is biased into this position by the action of the nonsealing end of the second valve member, i.e. the resilient walls surrounding aperture 46. As a result, first valve member 36 normally sealingly engages valve seat 44 and must be moved away from the engaging position, against the biasing action of the resilient walls of the nonsealing end of the second valve member, in order to provide for fluid flow through passage 42. However, the movement of first valve member 36 relative to second valve member 38 required to terminate the sealing engagement between first valve member 36 and valve seat 44 and compress the resilient walls around aperture 46 is extremely slight. Thus, the valve means is quite sensitive to the movement of piston rod 28 and will permit fluid flow into the channel defined by tubular member 26 only when piston rod 28 is moved towards aperture 46. Otherwise, fluid flow is prevented.

It can be seen that the present invention comprises a dashpot which can be used for either push damping or pull damping. In either case the dashpot consists of precisely the same components, the only difference being the orientation of the second valve member relative to the first valve member. When the valve members are oriented in one way, damping is produced in one axial direction. When the valve members are oriented in the other way, damping is produced in the other axial direction. The resiliency of the second valve member permits insertion of the first valve member therein in either orientation.

The first valve member need not necessarily be present in the second valve member when manufacture of the components is completed. The components can be oriented and assembled according to the requirements of a particular application. If, at any time, a change from one type of damping to the other is necessary, the casing can be opened and the orientation of the first and second valve members reversed, thus changing the damping direction. In this manner an inexpensive and versatile dashpot can be produced which can be utilized for push damping or pull damping, as desired.

While only a single embodiment of the present invention has been disclosed herein for purposes of illustration, it is obvious that many modifications and variations could be made therein. It is intended to cover all of these modifications and variations which are included within the scope of the present invention as defined by the appended claims.

I claim:

1. In a dashpot comprising a cylinder, a piston sealingly slidable in said cylinder, a piston rod operatively connected to said piston for moving the latter and fluid flow means extending through said piston; the improvement which comprises a first valve member operatively connected to said piston rod for movement therewith, and a reversible second valve member within which said first valve member is received, said second valve member being associated with said first valve member in either a first or a second orientation relative thereto, said second valve member being mounted on said piston and having a fluid passage therethrough defining a part of said fluid flow means, and said first and second valve members having parts operative when force is applied to said piston rod in one axial direction or the other to close or open said fluid passage respectively, one orientation of said second valve member relative to said first valve member closing said fluid passage when said piston rod is urged in one axial direction and the other orientation of said second valve member relative to said first valve member closing said fluid passage when said piston rod is urged in the other axial direction.

2. The dashpot of claim 1 wherein said piston has a recess in which said second valve member is received.

3. The dashpot of claim 1 wherein said fluid flow means comprises a fluid flow channel extending to the inside surface of said piston and wherein said second valve member is mounted on said piston with said fluid flow passage in fluid communication with said fluid flow channel.

4. The dashpot of claim 1 wherein said first and second valve members have a ball and socket interengagement.

5. The dashpot of claim 1 wherein said second valve member has a sealing end and a nonsealing end and said first valve member is normally in contact with said sealing end of said second valve member and is movable away therefrom to said nonsealing end thereof.

6. The dashpot of claim 5 further comprising biasing means for urging said first valve member into engagement with said sealing end of said second valve member.

7. The dashpot of claim 6 wherein said second valve member is made of resilient material and said biasing means comprises said nonsealing end.

8. The dashpot of claim 7 wherein said first valve member is always in contact with said nonsealing end.

9. The dashpot of claim 1 wherein said second valve member is resilient and said first valve member is snap-receivable into the interior thereof past either end of said second valve member.

10. The dashpot of claim 1 wherein said second valve member has a continuous sealing flange at one end thereof and an interrupted flange at the other end thereof.

11. The dashpot of claim 10 wherein said first valve member engages said flanges.

12. The dashpot of claim 1 further comprising a fluid passage in the side wall of said second valve means to permit the flow of fluid past said first valve member.

13. In a dashpot comprising a cylinder, a piston sealingly slidable in said cylinder, a piston rod operatively connected to said piston for moving the latter and fluid flow means extending through said piston; the improvement which comprises a first valve member operatively connected to said piston rod for movement therewith and a reversible second valve member within which said first valve member is received, said second member having first and second ends, said second member having a fluid flow passage therethrough extending between a fluid sealing means at said first end and a fluid passage means at said second end and said first member having a limited degree of movement with respect to said second member between engagement with said sealing means and said passage means respectively to prevent and permit fluid flow respectively, said reversible second valve member being receivable over said first valve member in a first orientation with its first end oriented toward said piston rod to cause fluid flow to be prevented when said piston rod is pulled or being receivable over said first valve member in a second orientation with its second end oriented toward said piston rod to cause fluid flow to be prevented when said piston is pushed, and means for mounting said second valve member on said piston with its fluid flow passage defining a part of said fluid flow means.

14. The dashpot of claim 13 wherein said piston has a recess in which said second valve member is received.

15. The dashpot of claim 13 wherein said fluid flow means comprises a fluid flow channel extending to the inside surface of said piston and wherein said second valve member is mounted on said piston with said fluid flow passage in fluid communication with said fluid flow channel.

16. The dashpot of claim 13 wherein said first and second valve members have a ball and socket interengagement.

17. The dashpot of claim 13 wherein said second valve member has a first end and a second end and said first valve member is normally in contact with said first end of said second valve member and is movable away therefrom to said second end thereof.

18. The dashpot of claim 17 further comprising biasing means for urging said first valve member into engagement with said first end of said second valve member.

19. The dashpot of claim 18 wherein said second valve member is made of resilient material and said biasing means comprises said second end.

20. The dashpot of claim 13 wherein said first valve member is always in contact with said second end.

21. The dashpot of claim 20 wherein said second valve member is resilient and said first valve member is snap-receivable into the interior thereof past either end of said second valve member.

22. The dashpot of claim 13 wherein said second valve member has a continuous sealing flange at one end thereof and an interrupted flange at the other end thereof.

23. A dashpot or the like comprising a cylinder, a piston slidable within said cylinder, a rod for moving said piston within said cylinder, said piston having a fluid channel therethrough, and means for regulating the flow of fluid through said channel to resist movement of said piston within said cylinder in a given direction, said regulating means comprising a hollow casing mounted on said piston and having a port at each end thereof, one of said ports being in fluid communication with said channel, and valve means situated within said casing, said valve means comprising a body having a passage therethrough, a valve seat at one end of said passage and an aperture at the other end of said passage, said rod extending through one of said ports and being operably connected to a member to move the same, said member being movable within said passage and adapted to seal said seat when placed adjacent thereto due to movement in said given direction, said aperture and said member being shaped to prevent sealing engagement therebetween, said body having a bilaterally symmetrical outer configuration and said casing having a socket mating with said outer configuration of said body into which said body is received in either a first orientation with its valve seat towards said one of said ports or a second orientation with its valve seat toward the other of said ports whereby the selected orientation of said body determines said given direction.

* * * * *